United States Patent
Morris et al.

(10) Patent No.: US 6,648,195 B2
(45) Date of Patent: Nov. 18, 2003

(54) SELF-LOCKING BICYCLE CARRIER

(75) Inventors: James C. Morris, Penticton (CA); Lopin Wang, Taichung (TW); Donald E. Schlenker, Penticton (CA)

(73) Assignee: Danik Industries Ltd., Penticton (CA)

( * ) Notice: Subject to any disclaimer, the term of this patent is extended or adjusted under 35 U.S.C. 154(b) by 0 days.

(21) Appl. No.: 09/871,346

(22) Filed: May 30, 2001

(65) Prior Publication Data

US 2001/0025866 A1 Oct. 4, 2001

Related U.S. Application Data

(63) Continuation of application No. 09/209,928, filed on Dec. 9, 1998, now Pat. No. 6,321,962.

(51) Int. Cl.[7] ............................................. B60R 11/00
(52) U.S. Cl. ..................... 224/505; 224/506; 224/534; 224/535; 224/536; 224/571; 224/924; 403/396
(58) Field of Search ......................... 224/924, 502–509, 224/533–537, 568, 569, 571; 403/398, 359.1, 396

(56) References Cited

U.S. PATENT DOCUMENTS

| | | | | | |
|---|---|---|---|---|---|
| 610,132 A | * | 8/1898 | Goodridge | ............... | 403/359.1 |
| 1,742,450 A | * | 1/1930 | Riemenschneider | ........ | 403/398 |
| 4,234,112 A | * | 11/1980 | Gallant | .................... | 224/570 X |
| 5,092,504 A | * | 3/1992 | Hannes et al. | .......... | 224/924 X |
| 5,303,857 A | * | 4/1994 | Hewson | | |
| 5,332,134 A | * | 7/1994 | Chen | ...................... | 224/558 X |
| 5,509,751 A | * | 4/1996 | Keller | .................... | 403/396 X |
| 5,573,165 A | * | 11/1996 | Bloemer et al. | ........ | 224/924 X |
| 5,695,101 A | * | 12/1997 | Frietze | | |
| 5,775,555 A | * | 7/1998 | Bloemer et al. | ........ | 224/924 X |

* cited by examiner

*Primary Examiner*—Stephen K. Cronin
(74) *Attorney, Agent, or Firm*—Blakely Sokoloff Taylor & Zafman LLP

(57) ABSTRACT

A carrier comprised of a holding member and an article support member. The holding member includes a tubing with a plurality of grooves lengthwise down the tubing. The article support member is coupled to the holding member. The article support member includes a tray and a collar. The collar is coupled to the tray and interlocks with the holding member in a plurality of angular orientations. The collar enables the tray to be rotatably adjusted with a slope in accordance with a selected angular orientation of the plurality of angular orientations. An integral locking mechanism allows an article to be locked to the carrier.

20 Claims, 6 Drawing Sheets

SELF-LOCKING BICYCLE CARRIER

This is a continuation of application Ser. No. 09/209,928, filed Dec. 9, 1998, which matured into U.S. Pat. No. 6,321,962.

BACKGROUND

1. Field of the Invention

The present invention relates to the field of bicycle carriers. In particular, the present invention relates to a carrier including one or more adjustable article support members to secure bicycles during transport and to protect against theft.

2. General Background

For many years, a substantial majority of bicycle frames have been manufactured with a generally horizontal top tube, which is connected to the seat tube and the head tube of the frame. In light of these features, rear-mounted bicycle carriers have been designed to hold the top tube of a bicycle frame during transport. For example, both U.S. Pat. No. 4,646,414 and U.S. Pat. No. 5,190,195 disclose standard rear-mounted bicycle carriers, each employing a pair of horizontal, hook-like arms to support the top tube of a bicycle frame. In addition, U.S. Pat. Nos. 5,529,231 and 5,647,521 disclose a rear-mounted bicycle carrier having a horizontal support member upon which V-shaped frame holders are permanently affixed. A single clamping mechanism, when fastened, is used to secure all of the bicycles placed on the V-shaped frame holders. The clamping mechanism is incapable of securing individual bicycles.

It is evident, however, that these rear-mounted bicycle carriers are unable to easily accommodate bicycles with sloped top tubes, which are usually found in ladies' bicycles and in an increasing number of mountain and racing bicycles. Normally, bicycles having sloped top tubes (generally referred to herein as "sloped tube bicycles") rest in an awkward, unstable position when transported by conventional rear-mounted bicycle carriers. This awkward position can cause damage to the bicycle or cause the bicycle to become partially or completely dislodged from the carrier during transit.

In addition, conventional rear-mounted bicycle carriers are designed so that the spatial distance between bicycle frames placed on the carrier is constant and non-modifiable. This is problematic when bicycles are upgraded with components that increase the width of the bicycle. For example, a bicycle with front-fork shock absorbers would require more spacing between neighboring bicycles than a conventional bicycle. If the additional spacing cannot be provided, some of the bicycles being transported can become damaged. Hence, it is desirable to provide a self-locking carrier that allows the spacing between neighboring bicycles placed on the carrier to be adjusted.

SUMMARY

Briefly, the present invention relates to a carrier comprising a holding member and an article support member. The holding member includes a tubing with a plurality of grooves length-wise down the tubing. The article support member is coupled to the holding member. The article support member includes a tray and a collar. The collar is coupled to the tray and interlocks with the holding member in a plurality of angular orientations. In one embodiment, the interlocking is accomplished by a pivotal release clamp having a protrusion complementary to the groove. The collar enables the tray to be rotatably adjusted with a slope of a selected angular orientation. Also, placed within the interior of the tubing is an integral locking mechanism to ensure that the article cannot be unknowingly removed from the carrier.

BRIEF DESCRIPTION OF THE DRAWINGS

The features and advantages of the present invention will become apparent from the following detailed description of the present invention in which.

DETAILED DESCRIPTION

Herein, an embodiment of a carrier comprising one or more adjustable article support members is shown. Each article support member is designed to accommodate articles with different structures such as, for example, any type of bicycle including sloped tube bicycles of varying tube diameters, skis, wheelchairs and the like. While numerous specific details are set forth in order to provide a thorough understanding of the invention, it is apparent to one of reasonable skill in the art that the invention may be practiced without these specific details. In fact, to avoid unnecessarily obscuring the invention, well known features may not be described herein.

Figure 1:
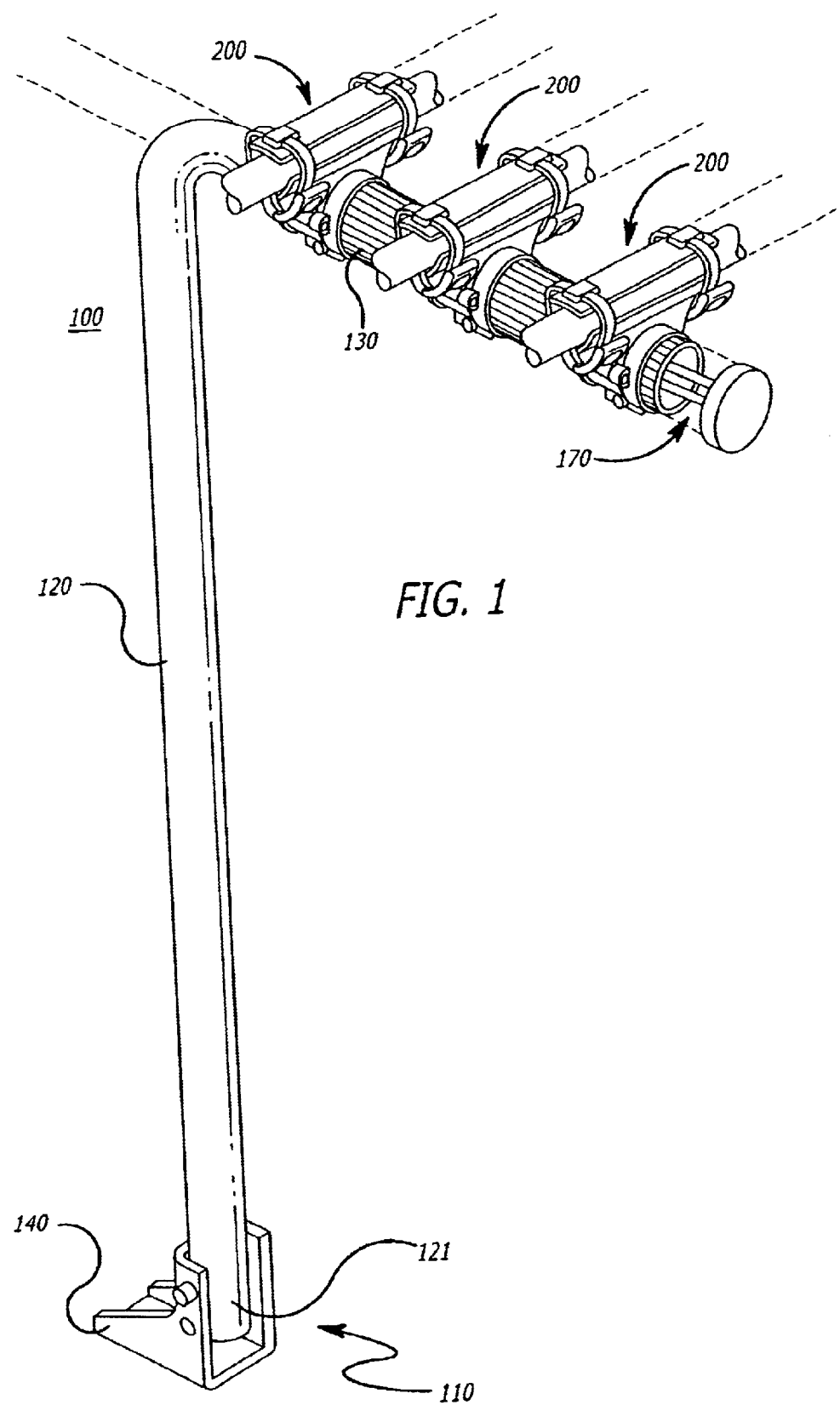
FIG. 1 is a prospective view of an embodiment of a self-locking carrier including adjustable, article support members.

Referring now to FIG. 1, a perspective view of an illustrative embodiment of a carrier 100 comprising a plurality of article support members 200 is shown. Carrier 100 comprises a base member 110, a column member 120 and a holding member 130. In particular, base member 110 is capable of being securely attached to a hitch receiver of a vehicle through a fold-down receiver footing 140. Of course, it is contemplated that carrier 100 maybe attached to a bumper or chassis of a vehicle in lieu of the hitch receiver. Also, instead of being attached to a vehicle, carrier 100 may be used as a stationary locking apparatus.

Figure 2:
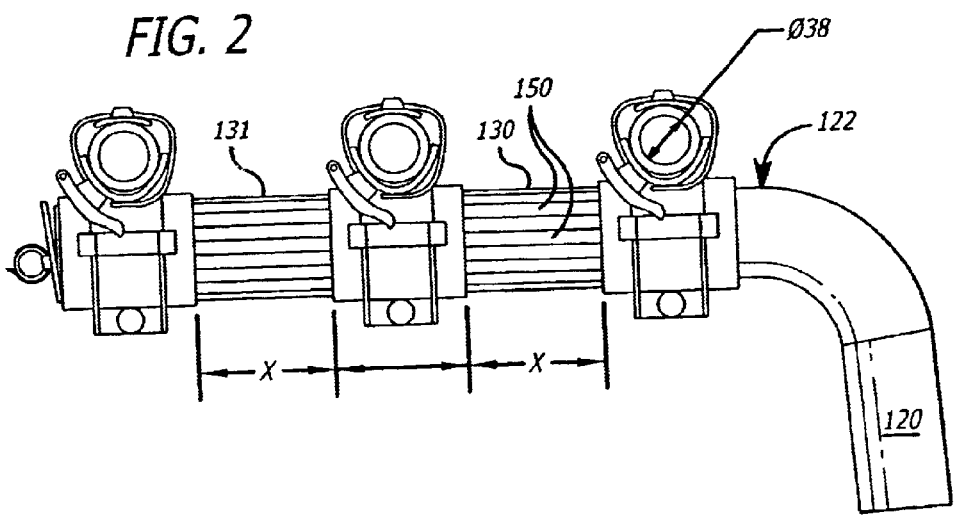
FIG. 2 is a side view of column and holding members of the carrier of FIG. 1 inclusive of a locking mechanism and article support members.

As further shown in both FIGS. 1 and 2, column member 130 includes a cylindrical tube having a first end 121 coupled to base member 110 and a second end 122 coupled to holding member 130. In particular, at the first end 121, column member 120 is pivotally coupled to base member 110. This allows column member 120 to be rotated downward for loading and unloading of articles and to remain generally perpendicular to base member 110 during transport. Column member 120 is coupled to holding member 130 at second end 122 as shown in more detail in FIG. 2.

Referring now to FIG. 2, one embodiment of holding member 130 includes a cylindrical tube having an outer surface 131 featuring a plurality of orientation grooves 150 lengthwise across the tube. For this embodiment, orientation grooves 150 are immediately adjacent to each other and placed around a circumference of outer surface 131 (e.g., each groove occupies about one-twentieth of the circumference of holding member 130). This allows a spacing distance (X) between article support members 200 to be adjustable. It is contemplated, however, that grooves 150 may be separated from each other by non-grooved or protruding portions separated by a common distance or by varying distances.

Figure 3:
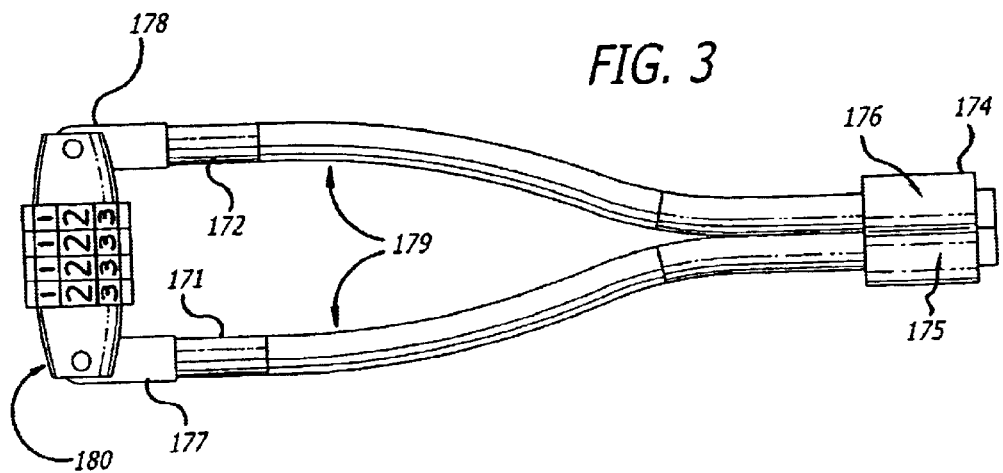
FIG. 3 is a top-down view of an illustrative embodiment of the locking mechanism of FIG. 2.
Figure 4:
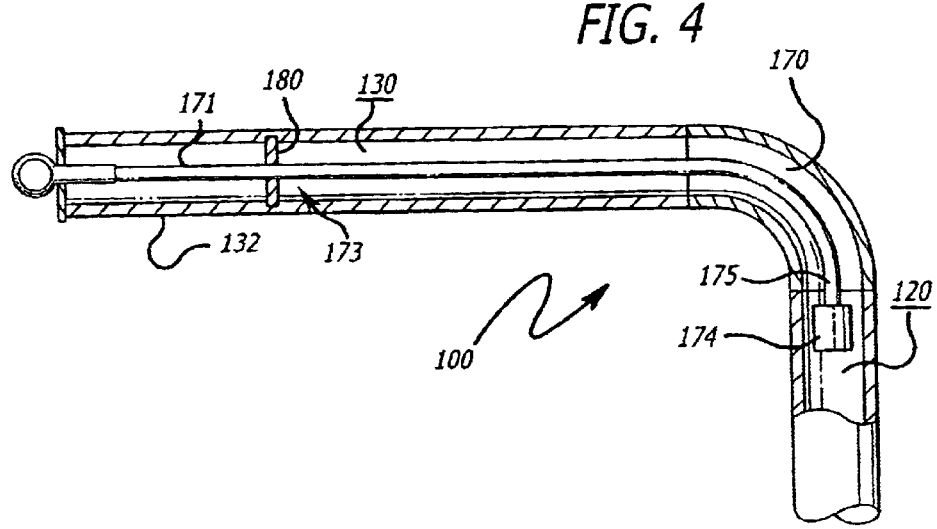
FIG. 4 is a prospective view of an illustrative embodiment of one of the cables associated with the locking mechanism of the carrier.

Referring now to FIGS. 3 and 4, in this embodiment, an integral, locking mechanism 170 is implemented within carrier 100. As shown, locking mechanism 170 includes a plurality of single cable lock at end of collar cables 171 and 172 situated within the cylindrical tubing of holding member 130 and optimally column member 120. These cables 171 and 172 are made of metal, a hardened plastic or any other material that is difficult to break. Optionally, to avoid wearing cables 171 and 172, an optional plastic sheath 179 is placed over each cable 171 and 172.

Cables 171 and 172 are prevented from being completely removed and disconnected from carrier 100 by (i) providing a channel 173 through which cables 171 and 172 can be pulled therethrough, and (ii) securely attaching a clamp 174 at one end 175 and 176 of cables 171 and 172, respectively. Channel 173 is created, for example, by placing of a pre-manufactured insert 180 within the cylindrical tubing of holding member 130, placing one or more rivets through holding member 130 at one or more selected locations (as shown) and the like. By sizing clamp 174 to be greater in size than channel 173, cables 171 and 172 can only be partially removed from holding member 130, not completely removed.

The opposite ends 177 and 178 of cables 171 and 172 are adapted with a cable lock holder (e.g., plastic eyed hooks) so that a lock 180 may be removably coupled to both cables 171 and 172. Herein, lock 180 includes a combination or key lock capable of coupling together cables 171 and 172 when secured, although other types of locks may be used. It is contemplated that lock 180 may include a pad lock when loops are placed at ends 177 and 178 of cables 171 and 172 as shown in FIG. 4. In a locked state, cables 171 and 172 are securely coupled to lock 180. In an unlocked state, cables 171 and 172 may be separated so that one or more of cables 171 and 172 can be wound around the article nearest a far end 132 of holding member 130.

Figure 10:
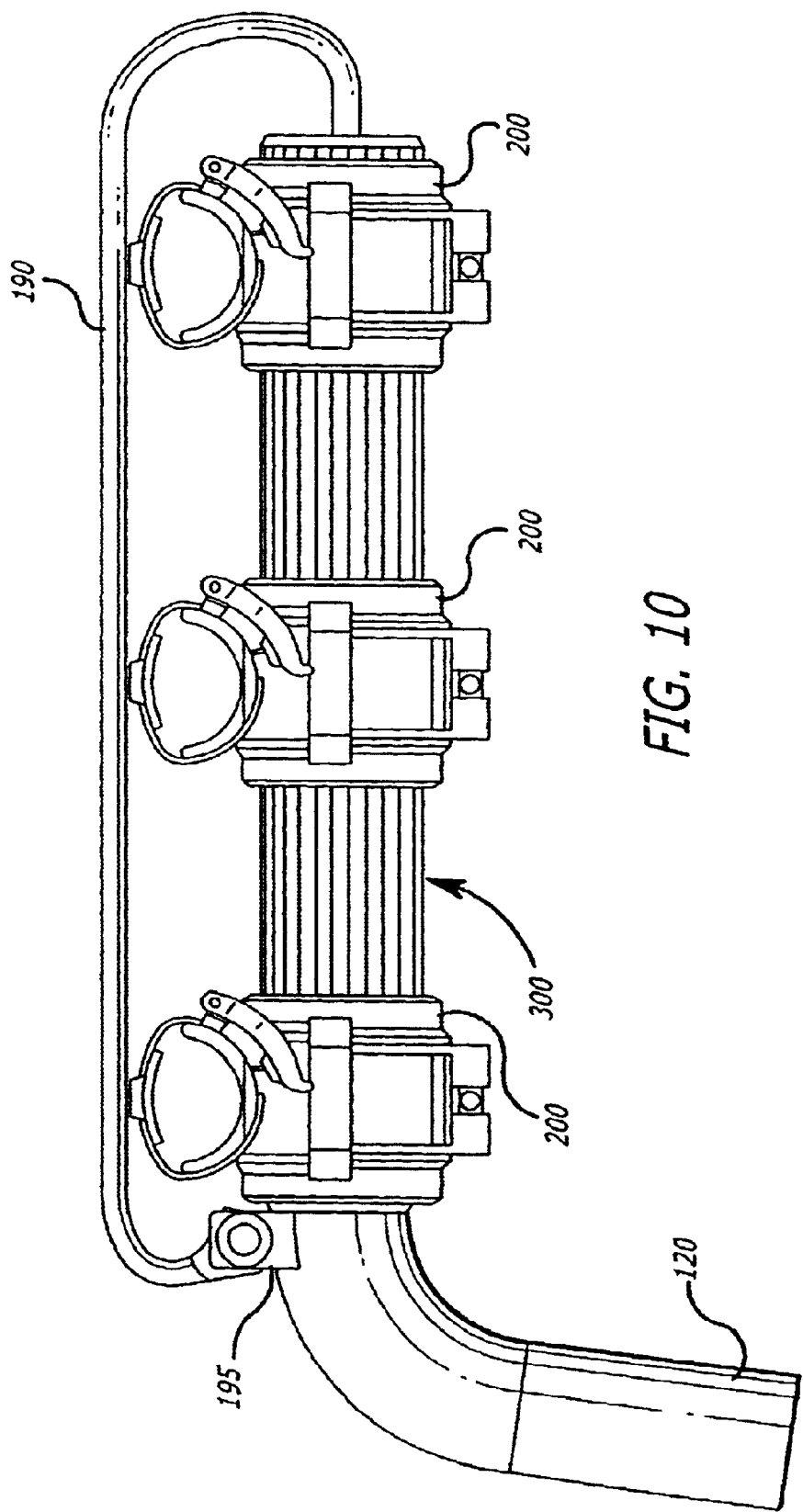
FIG. 10 is a prospective view of a second embodiment of the locking mechanism.

It is contemplated that another embodiment of locking mechanism 170 includes a single cable 190 placed with the cylindrical tubing of the holding member 130 and optionally column member 120 as shown in FIGS. 10 and 11. Similarly, at the end of cable 190, a clamp or other element (not shown) may be used to prevent cable 190 from being completely removed from the tubing of holding member 130. To lock an article, cable 190 would be partially removed from the tubing of holding member 130 and wrapped either around a portion of the article, or perhaps placed through an aperture of the article. Cable 190 would be attached to article support member 200. Of course, this would require article support member 200 to include a locking device 195 to receive and secure cable 190. It is contemplated that the type of locking device 195 includes a tubular lock requiring a key for placement in a locked and unlocked state, although any other type of locking device may be used.

Figure 5:
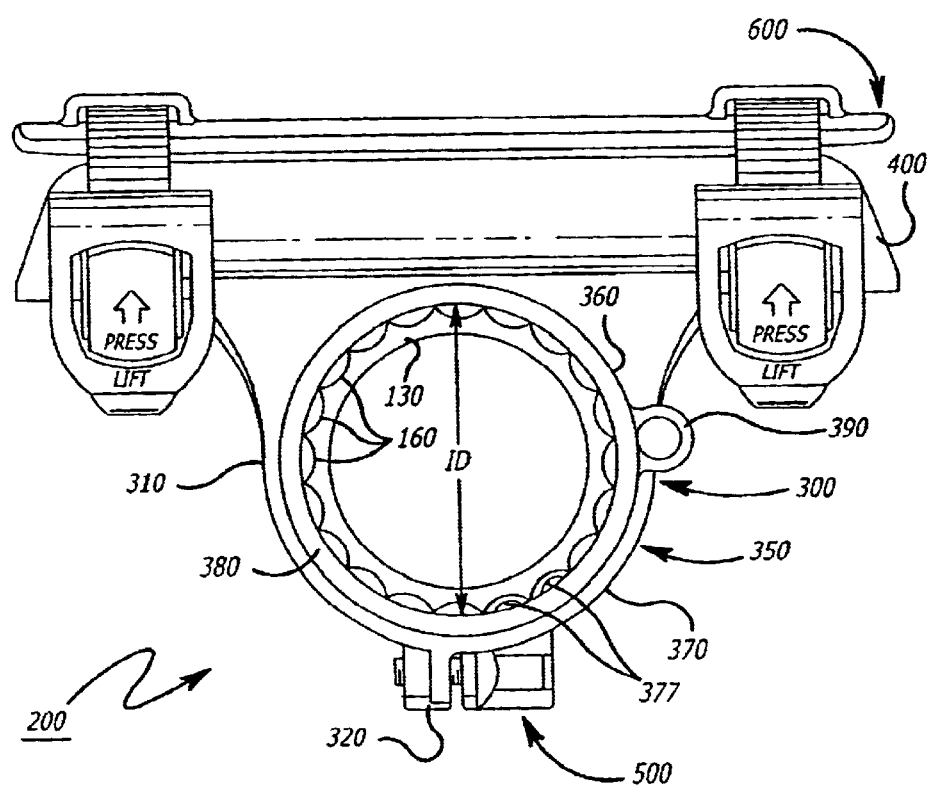
FIG. 5 is a front view of an illustrative embodiment of an article support member mounted on the holding member of FIG. 2.
Figure 6:
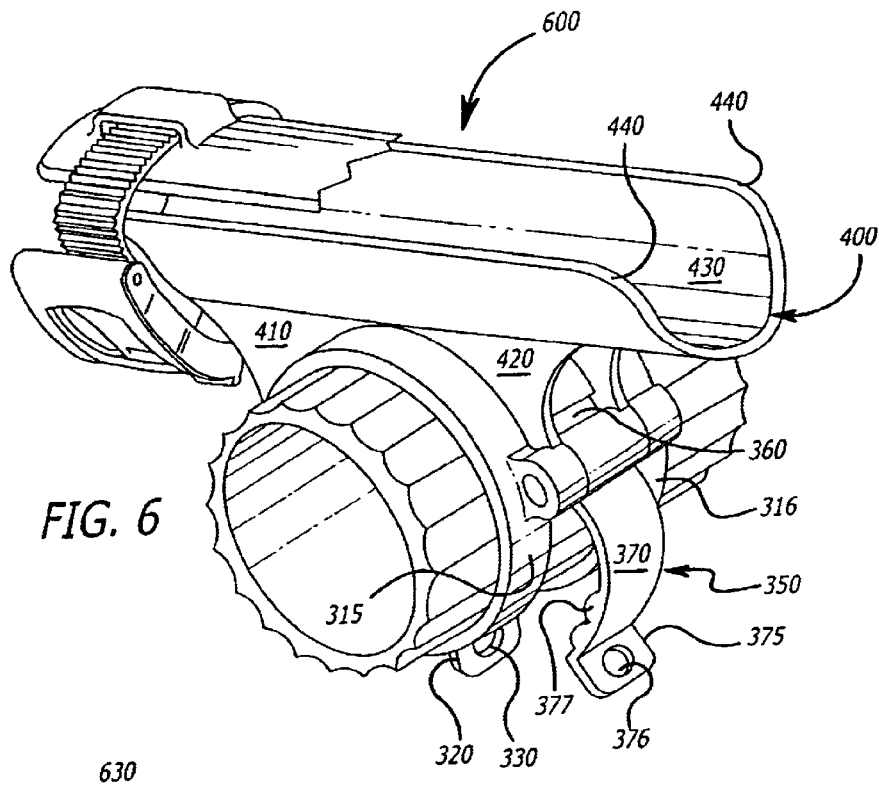
FIG. 6 is a prospective view of one illustrative embodiment of an article support member of FIGS. 2 and 5 before attachment of the collar fastening mechanism.
Figure 7:
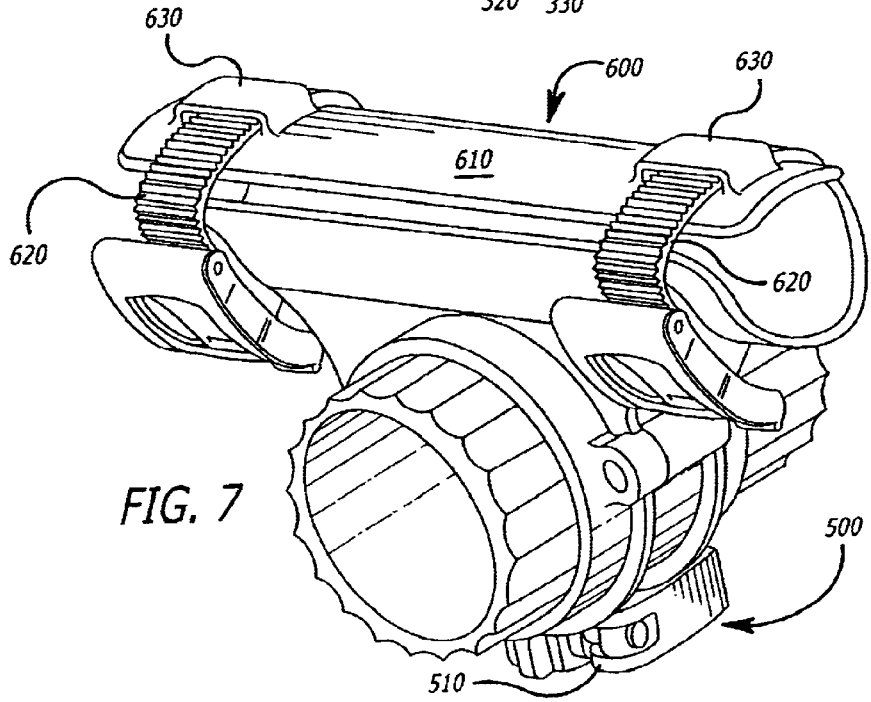
FIG. 7 is a prospective view of the illustrative embodiment of the article support member of FIG. 6 after attachment of the collar fastening mechanism.

Referring now to FIGS. 5–7, an illustrative embodiment of article support member 200 is shown. Article support member 200 comprises a collar 300, a tray 400, a collar fastening mechanism 500 and an article anti-sway mechanism 600. In one embodiment, article support member 200 is substantially made of a hardened plastic. This allows collar 300 and tray 400 to be molded together as a single structure. Instead of hardened plastic, it is contemplated that article support member 200 may be substantially made of metal in which collar 300 and tray 400 are molded together either as a single structure or attached together through adhesive, welding or any other type of fastening technique.

As shown in FIG. 5, an embodiment of collar 300 comprises a curved collar portion 310 and a curved release clamp 350 placed between a pair of circumferential collar portions 315 and 316 having an inner diameter slightly greater than an outer diameter of the holding member 130. In particular, curved collar portion 310 includes an end 320 having an aperture 330 for collar fastening mechanism 500 (see FIG. 6). In this embodiment, curved collar portion 310 is permanently positioned while release clamp 350 is pivotal about a hinge 390. Release clamp 350 includes a stationary first segment 360 and a pivotal second segment 370 having an end 375 with an aperture 376 for collar fastening mechanism 500 (see FIG. 6). Thus, when placed in a closed state, release clamp 350 is positioned so that aperture 330 is generally aligned with aperture 376.

In addition, an inner surface 380 of second segment 370 is configured to generally interlock with outer surface 160 of holding member 130 while the remaining inner surface of collar 300 is held on holding member 130 by applied pressure. For example, in this embodiment, second segment 370 of release clamp 350 includes one or more protrusions 377 complementary with the orientation grooves 150 of holding member 130 of FIGS. 1 and 2. Of course, protrusions 377 can possess any geometric shape so long as it is complementary and adaptive to generally interlock with grooves 150. As a result, once article support member 200 is placed on holding member 130 and rotated as need to accommodate different types and structures of the articles, release clamp 350 is placed in a closed position to present article support member 200 from further unwanted rotation. Herein, when in a closed state, a diameter (ID) of inner surface 380 of collar 300 is measured to be slightly greater than the diameter of holding member 130 of FIG. 2 taken from its outer surface 160.

Referring to FIG. 6, tray 400 is placed along curved collar portion 310 and stationary 360 segment of release clamp 350 through buttress portions 410 and 420, respectively. These buttress portions 410 and 420 provide a stable structure to support an article. Tray 400 further includes a generally concave channel 430 which features a plurality of extensions 440 at its ends to prevent the article (not shown) from swaying and/or becoming dislodged during transport. It is contemplated that tray 400 may be configured in a half-rectangular shape to hold skis or in any different shape to hold the article(s). To further prevent swaying of the article during transport, a material (e.g., Kraton) having an acceptable coefficient of friction may be placed on channel 430 and/or one or more of extensions 440.

Referring now to FIG. 7, fastening mechanisms of article support member 200 include (i) collar fastening mechanism 500 joining collar portion 310 and release clamp 350 (see FIG. 5), and (ii) article anti-sway mechanism 600. An example of collar fastening mechanism 500 includes a quick release lever 510 which, when inserted through apertures 330 and 376 (see FIG. 5) and placed in a locked state provides positive fastening (e.g., pressure and interlocked protrusion(s)/groove(s)) of collar 300 on to holding member 130. When placed in an unlocked state, article support member 200 can be rotated and moved laterally along holding member 130.

Referring still to FIG. 7, an example of article anti-sway mechanism 600 includes a cap 610 which conforms with the curvature of channel 430 and is designed to rest over a portion of an article to prevent the article from being dislodged from channel 430. Cap 610 is secured by inserting fastening straps 620 (e.g., VELCRO®straps, canvas straps, etc.) through strap inserts 630 placed on a top surface of cap 610.

Figure 8:
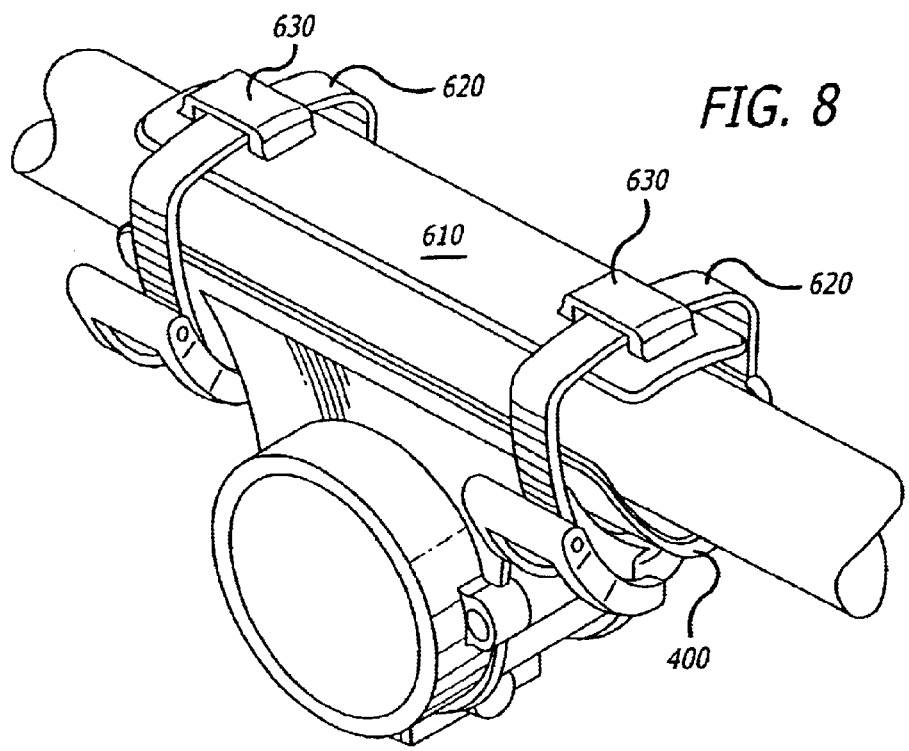
FIG. 8 is a prospective view of the article support member of FIG. 7 when placed in a locked state.
Figure 9:
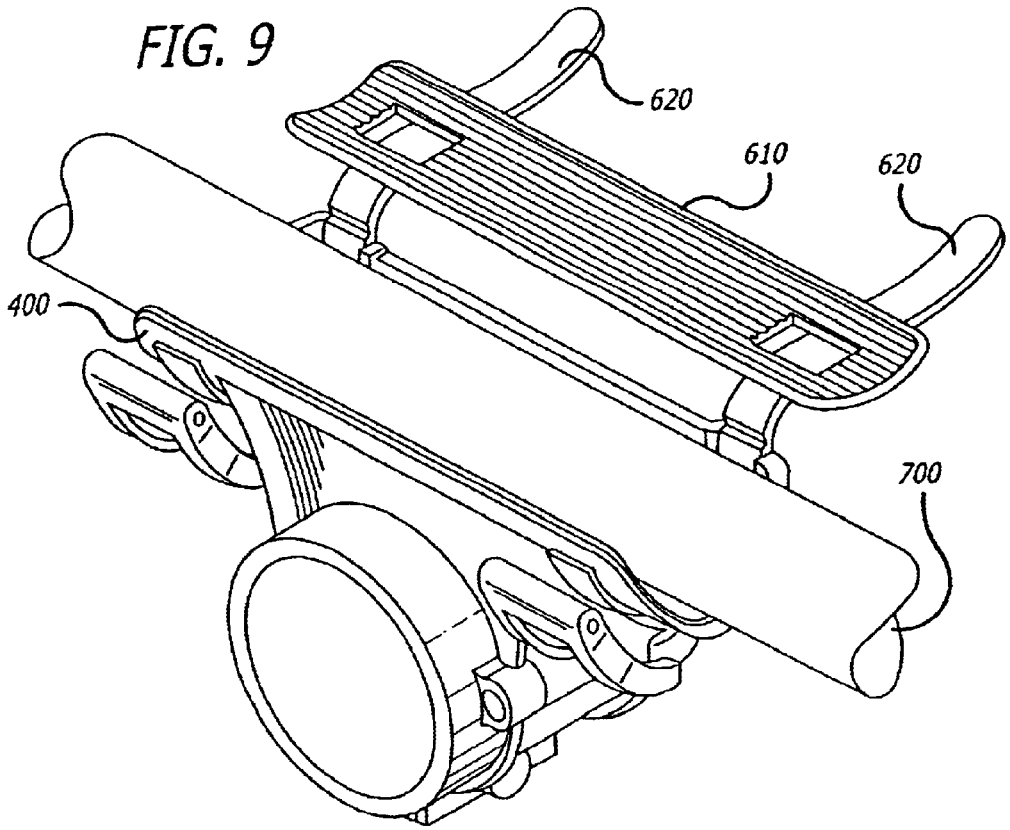
FIG. 9 is a prospective view of the article support member of FIG. 7 when placed in an unlocked state.

Thus, as shown in FIG. 8, in a locked state, cap 610 is positioned over an article resting in channel 430. Straps 620 are inserted through inserts 630 and fastened to ensure that cap 610 maintains the article (placed in tray 400) from becoming dislodged. In an unlocked state, as shown in FIG. 9, straps 620 are loosened so cap 610 does not rest above the channel to allow the article 700 (e.g., a top-tube of a sloped-tube bicycle) from being removed from the channel of tray 400.

The present invention described herein may be designed in many different architectures and using many different components. While the present invention has been described in terms of various embodiments, other embodiments may come to mind to those skilled in the art without departing from the spirit and scope of the present invention. The invention should, therefore, be measure in terms of the claims which follow.

What is claimed is:

1. A carrier adapted for coupling to a vehicle, comprising:
   a holding member having a first plurality of orientation grooves; and
   an article support member coupled to the holding member, the article support member comprises a tray to hold a tube of a bicycle and a collar with at least one protrusion placed on an inner surface of the collar to mate with at least one and at most a second plurality of orientation grooves when the article support member is placed in a locked position to prevent the article support member from being rotatably adjusted, the second plurality of orientation grooves being substantially lesser in number than the first plurality of orientation grooves.

2. The carrier of claim 1 further including a locking mechanism placed with the holding member and partially removable from the holding member, the locking mechanism comprises a cable, a clamp coupled to a first end of the cable to prevent complete removal of the cable from the holding member, and a lock coupled to a second end of the cable for attachment to a portion of the holding member.

3. The carrier of claim 1, wherein the at least one protrusion includes at most two protrusions.

4. The carrier of claim 1, wherein a number of protrusions corresponding to the at least one protrusion is lesser in number than thirty percent of the first plurality of orientation grooves.

5. The carrier of claim 1, wherein the tray of the article support member having a generally concave channel.

6. The carrier of claim 5, wherein the tray and the collar are molded together as a single structure.

7. The carrier of claim 1, wherein the holding member of the article support member being placed in a substantial horizontal orientation.

8. The carrier of claim 7, wherein the collar includes a curved collar portion and a release clamp forming a tubular segment of the collar.

9. The carrier of claim 8, wherein the release clamp is formed by a stationary first segment proximate to the tray and a pivotal second segment including the at least one protrusion complementary with at least one of the second plurality of orientation grooves.

10. The carrier of claim 8, wherein the release clamp is positioned between a pair of circumferential collar portions having an inner diameter slightly greater than an outer diameter of the holding member.

11. The carrier of claim 8, wherein the curved collar portion and the release clamp are coupled together by a quick release lever.

12. Adapted to a holding member having grooves, an article support member, comprising:
   an element with a substantially concave channel to support a bicycle during transit; and
   a collar coupled to the element, the collar including a segment with an inner surface having at least one protrusion complementary to at least one groove of the holding member, the at least one protrusion being an integral part of the inner surface for fastening and preventing further angular rotation of the collar when placed in a locked position and being lesser in number with a number of grooves of the holding member.

13. The article support member of claim 12, wherein the element is a tray.

14. Adapted for a vehicle, a bicycle carrier comprising:
   a holding member including a plurality of orientation grooves; and
   an article support member coupled to the holding member to support a bicycle, the article support member including
   a collar that comprises a plurality of collar segments forming an opening, one of the plurality of collar segments including an inner surface having at least two protrusions so that the protrusions are only placed on a predetermined portion of the inner surface and not along a perimeter formed by the inner surface, the protrusions being complementary in shape with at least two of the plurality of orientation grooves of the holding member for mating with the at least two of the plurality of orientation grooves of the holding member to prevent unwanted rotation of the article support member when the article support member is slid onto the holding member and placed in a locked position.

15. The carrier of claim 14 further comprising a column member coupled to the holding member so that the column member and the holding member reside in a single plane.

16. The carrier of claim 14, wherein the holding member is tubing having the plurality of orientation grooves being oriented lengthwise along the tubing.

17. The carrier of claim 14, wherein the collar includes a movable release clamp positioned between the plurality of collar segments.

18. The carrier of claim 14, wherein the article support member includes a tray having a generally concave channel to hold the bicycle.

19. The carrier of claim 18, wherein the tray and the collar are made of plastic.

20. The carrier of claim 19, wherein the tray and the collar are molded together as a single structure.

* * * * *